(12) United States Patent
Bouchet et al.

(10) Patent No.: US 11,084,596 B2
(45) Date of Patent: Aug. 10, 2021

(54) AIRCRAFT COMPRISING AT LEAST ONE ENGINE ASSEMBLY LINKED TO THE FUSELAGE OF THE AIRCRAFT BY TWO CONNECTING RODS POSITIONED AT LEAST PARTIALLY IN AN AIR INLET OF THE ENGINE ASSEMBLY

(71) Applicant: Airbus Operations SAS, Toulouse (FR)

(72) Inventors: Eric Bouchet, Aussonne (FR); Jérôme Colmagro, Toulouse (FR); Michel Garcia, Bretx (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 389 days.

(21) Appl. No.: 16/173,190

(22) Filed: Oct. 29, 2018

(65) Prior Publication Data

US 2019/0144125 A1    May 16, 2019

(30) Foreign Application Priority Data

Oct. 30, 2017  (FR) ...................................... 1760258

(51) Int. Cl.
| | |
|---|---|
| *B64D 27/26* | (2006.01) |
| *B64D 27/20* | (2006.01) |
| *B64D 27/14* | (2006.01) |
| *B64D 29/06* | (2006.01) |
| *B64C 7/02* | (2006.01) |

(52) U.S. Cl.
CPC ................ *B64D 27/26* (2013.01); *B64C 7/02* (2013.01); *B64D 27/14* (2013.01); *B64D 27/20* (2013.01); *B64D 29/06* (2013.01); *B64D 2027/268* (2013.01)

(58) Field of Classification Search
CPC ........ B64D 27/02; B64D 27/14; B64D 27/20; B64D 27/26; B64D 2027/262; B64D 2027/268; B64D 29/04; B64D 29/06
See application file for complete search history.

(56) References Cited

U.S. PATENT DOCUMENTS

| | | | | |
|---|---|---|---|---|
| 4,044,973 A | * | 8/1977 | Moorehead ............ | B64D 27/20 244/54 |
| 5,443,229 A | * | 8/1995 | O'Brien ................. | B64D 27/20 244/54 |
| 6,068,212 A | | 5/2000 | Ash et al. | |

(Continued)

FOREIGN PATENT DOCUMENTS

| | | |
|---|---|---|
| EP | 0849165 A2 | 6/1998 |
| EP | 2706011 A1 | 3/2014 |

(Continued)

OTHER PUBLICATIONS

French Search Report; priority document.

*Primary Examiner* — Richard G Davis
(74) *Attorney, Agent, or Firm* — Greer, Burns & Crain, Ltd.

(57) ABSTRACT

An aircraft which comprises a fuselage and at least one propulsion assembly linked to the fuselage by at least two connecting rods positioned at least partially in an inner zone of the air inlet of the nacelle of the propulsion assembly. Thus, the connecting rods do not interfere with the secondary flow flowing inside the nacelle and do not affect the aerodynamic performance levels of the propulsion assembly.

11 Claims, 2 Drawing Sheets

(56) References Cited

U.S. PATENT DOCUMENTS

| | | | |
|---|---|---|---|
| 8,561,940 B2* | 10/2013 | Lisiewicz | B64D 27/26 244/54 |
| 2009/0090811 A1* | 4/2009 | Llamas Sandin | B64D 27/26 244/54 |
| 2010/0044502 A1* | 2/2010 | Cazals | B64D 41/00 244/54 |
| 2010/0108802 A1 | 5/2010 | Marche et al. | |
| 2012/0006937 A1* | 1/2012 | Lafont | B64D 29/04 244/54 |
| 2014/0064950 A1 | 3/2014 | Brochard et al. | |
| 2016/0069299 A1 | 3/2016 | Ruffino et al. | |

FOREIGN PATENT DOCUMENTS

| | | |
|---|---|---|
| FR | 2928137 A1 | 9/2009 |
| FR | 2934563 A1 | 2/2010 |
| FR | 2986844 A1 | 8/2013 |
| FR | 3039206 A1 | 1/2017 |
| WO | 2017134459 A1 | 8/2017 |

* cited by examiner

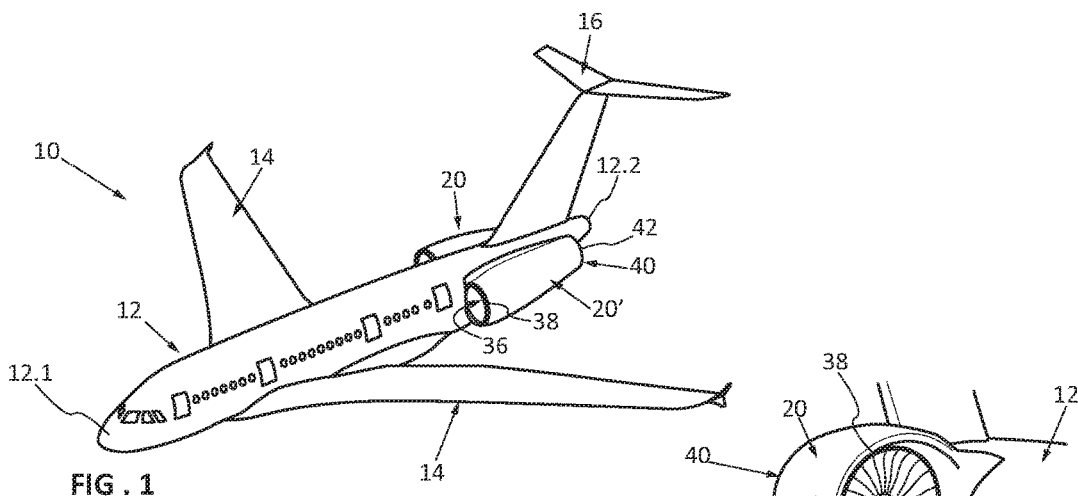
FIG. 1
Prior Art
FIG. 2
Prior Art
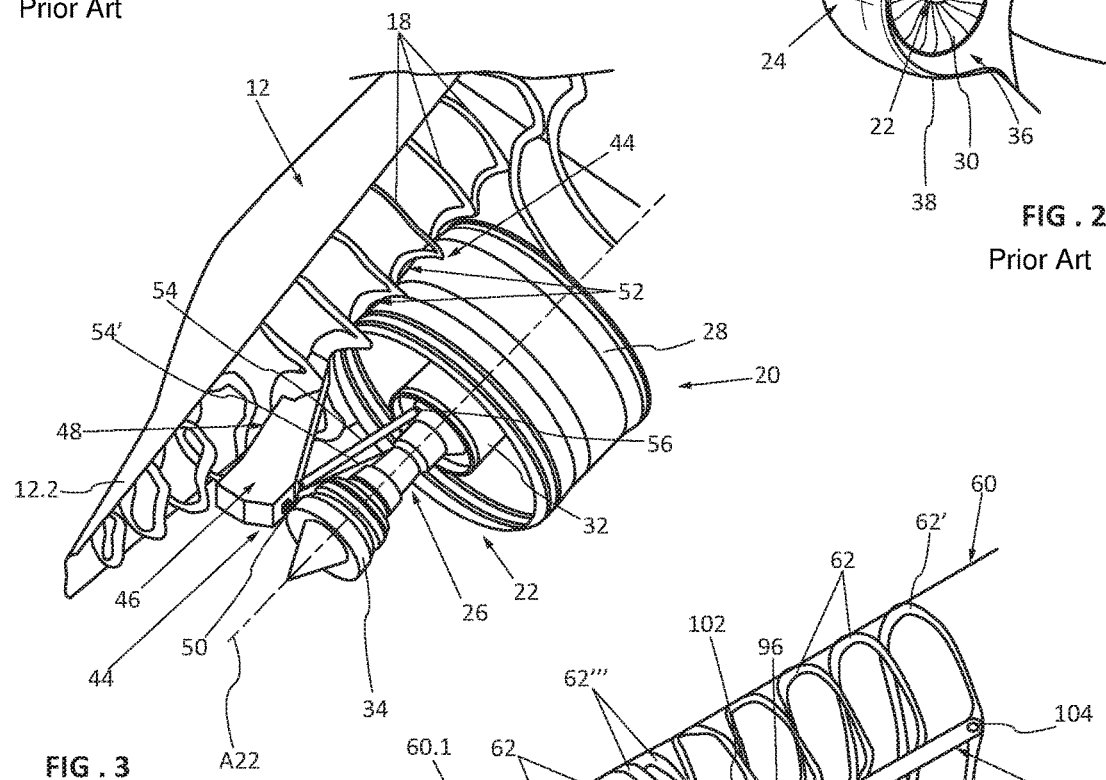
FIG. 3
Prior Art
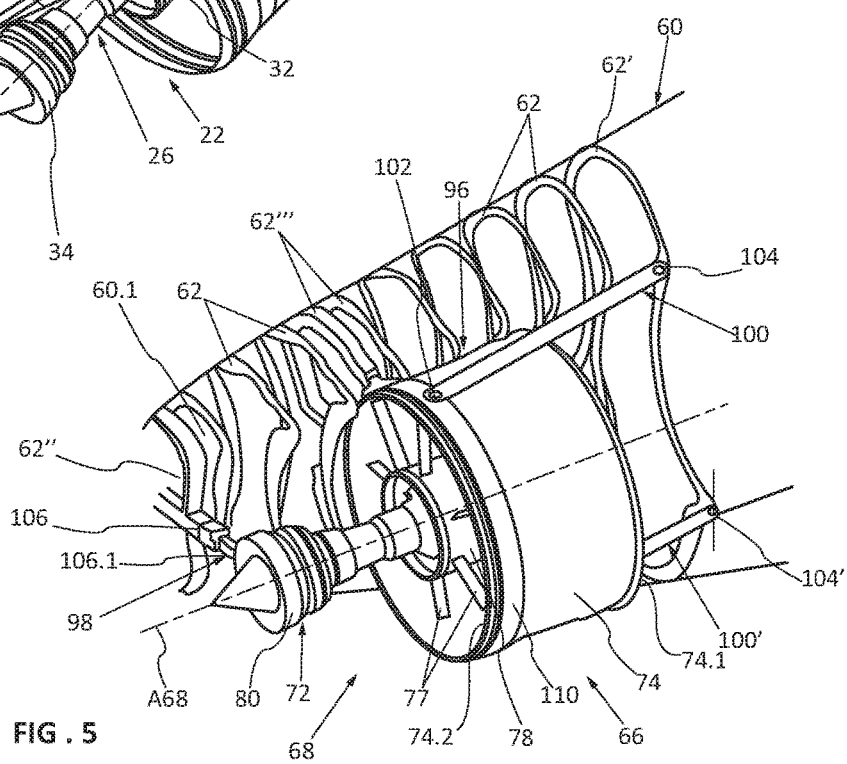
FIG. 5

AIRCRAFT COMPRISING AT LEAST ONE ENGINE ASSEMBLY LINKED TO THE FUSELAGE OF THE AIRCRAFT BY TWO CONNECTING RODS POSITIONED AT LEAST PARTIALLY IN AN AIR INLET OF THE ENGINE ASSEMBLY

CROSS-REFERENCES TO RELATED APPLICATIONS

This application claims the benefit of the French patent application No. 1760258 filed on Oct. 30, 2017, the entire disclosures of which are incorporated herein by way of reference.

BACKGROUND OF THE INVENTION

The present invention relates to an aircraft comprising at least one engine assembly linked to the fuselage of the aircraft by two connecting rods positioned at least partially in an air inlet of the engine assembly.

FIG. 1 shows, in 10, an aircraft comprising a fuselage 12 which extends from a nose cone 12.1 to a tail cone 12.2, wings 14 positioned on either side of the fuselage 12, approximately mid-way between the nose and tail cones 12.1, 12.2, and a tail unit 16 positioned at the tail cone 12.2 of the fuselage 12.

As illustrated in FIG. 3, the fuselage 12 comprises a framework which has frames 18, disposed in transverse planes and stringers as well as a skin added onto the framework.

The aircraft also comprises two propulsion assemblies 20, 20' disposed on either side of the fuselage 12 at the tail cone 12.2 of the fuselage.

As illustrated in detail in FIGS. 2 and 3, each propulsion assembly 20, 20' comprises an engine 22 and a nacelle 24 positioned around the engine 22, over a part of its circumference.

The engine 22 is of turbofan engine type. It comprises a core 26, which comprises in particular a rotor that pivots relative to a stator on a rotation axis A22 of the engine, and a fan casing 28 which has an approximately cylindrical form and in which there is a fan 30 linked to the rotor of the core 26 of the engine.

In operation, a first air flow, called primary flow, circulates inside the core 26 of the engine and a second flow, called secondary flow, circulates between the core 26 of the engine 22 and the nacelle 24.

Hereinafter in the description, the concepts of front and rear refer to the direction of flow of the gases, the front corresponding to the intake for the gases (air) into the engine 22 and the rear corresponding to the exhaust for the gases (combustion gases).

The core 26 extends from a front casing 32 which comprises an air intake to a rear casing 34 which comprises a combustion gas exhaust.

The nacelle 24 comprises, at the front, an air inlet 36 which has a lip 38 and a front inner duct in the extension of the lip 38, configured to channel the air towards the fan casing 28 and, at the rear, an exhaust 40 which has a trailing edge 42, a rear inner duct which extends from the fan casing 28 to the trailing edge. The nacelle 24 comprises at least one outer wall which extends from the lip 38 to the trailing edge 42.

In the present case, the nacelle 24 does not extend over all the circumference of the engine 22. The nacelle 24 is nested in the fuselage 12, the zones of which delimit a part of the air inlet 36 and a part of the exhaust 40. This configuration of propulsion assemblies called BLI, for Boundary Layer Ingestion, allows for a substantial saving in terms of energy consumption.

According to one embodiment, the engine 22 is linked to the fuselage 12 by a link 44.

According to a known embodiment illustrated by FIG. 3, the link 44 comprises a pylon 46, a first attachment 48 linking the pylon 46 and the fuselage 12, at least one rear engine attachment 50 linking the rear casing 34 of the core 26 of the engine 22 and the pylon 46, at least one front engine attachment 52 linking the fan casing 28 and the fuselage 12 and two connecting rods 54, 54' linking the core 26 of the engine, more specifically the front casing 32, and the pylon 46.

The connecting rods 54, 54' are linked to the front casing 32 of the core 26 of the engine at two anchoring points 56, 56', disposed on either side of a horizontal plane and passing through the axis A22 of the engine 22 and separated from the horizontal plane.

The parts of the pylon 46 and of the connecting rods 54, 54' positioned in the secondary flow are jacketed in a fairing 58 called bifurcation, represented by dotted lines in the FIG. 4, which is extended to the rear by an aft pylon fairing APF.

Given the separation of the anchoring points 56, 56' of the connecting rods 54, 54', the bifurcation 58 has a significant volume which adversely affects the aerodynamic performance levels of the propulsion assembly and increases the energy consumption thereof.

The present invention aims to remedy the drawbacks of the prior art.

SUMMARY OF THE INVENTION

To this end, a subject of the invention is an aircraft comprising a fuselage and at least one propulsion assembly which comprises:

an engine comprising a rotation axis, a core and a fan casing which has an approximately cylindrical form and has a front edge and a rear edge, a nacelle comprising, at the front, an air inlet which has a lip, a front inner duct configured to channel a flow of air towards the fan casing and an outer wall delimiting, with the lip and the front inner duct, an inner zone of the air inlet, a link linking the engine and the fuselage and comprising at least two connecting rods.

According to the invention, each connecting rod comprises a first anchoring point linking the connecting rod to the fan casing and a second anchoring point linking the connecting rod to the fuselage and offset forwards relative to the first anchoring point so that each connecting rod is positioned at least partially in the inner zone of the air inlet.

Since the connecting rods are positioned in the air inlet, they do not interfere with the secondary flow. Thus, they do not affect the aerodynamic performance levels of the propulsion assembly.

According to another feature, the engine comprises straighteners linking the fan casing and the core of the engine and, for each connecting rod, the first anchoring point is positioned in line with the straighteners.

According to another feature, for each connecting rod, the first and second anchoring points are arranged so that the connecting rod and the rotation axis of the engine form an angle less than 25°.

According to another feature, for each connecting rod, the first and second anchoring points are as far apart as possible.

According to a configuration, for each connecting rod, the first anchoring point is positioned approximately in a vertical plane containing the rotation axis of the engine.

According to an embodiment, the second anchoring point and the front edge of the fan casing are separated by a distance substantially equal to a distance separating the first anchoring point and the front edge of the fan casing.

According to a configuration, the second anchoring points are disposed in one and the same plane parallel to a vertical median plane of the fuselage.

According to an embodiment, the connecting rods are substantially symmetrical relative to a horizontal median plane of the engine.

According to another feature, the link linking the engine and the fuselage comprises a rear engine attachment comprising a crossmember which extends in a horizontal and transverse direction, which is linked to the fuselage and which has a first end linked to the core of the engine.

According to a configuration, the crossmember has a first end linked to the core of the engine of a first propulsion assembly and a second end linked to the core of the engine of a second propulsion assembly, the median part of the crossmember being linked to the fuselage.

According to another feature, the link linking the engine and the fuselage comprises a front engine attachment comprising a strap which bands the fan casing, and which is linked to the fuselage.

According to one embodiment, the strap is positioned in line with the straighteners.

BRIEF DESCRIPTION OF THE DRAWINGS

Other features and advantages will emerge from the following description of the invention, the description being given purely by way of example, in light of the attached drawings in which:

FIG. 1 is a perspective view of an aircraft equipped with propulsion assemblies positioned at the tail cone of the fuselage of the aircraft, FIG. 2 is a perspective view of a propulsion assembly which has a nacelle nested in the fuselage of the aircraft visible in FIG. 1, FIG. 3 is a perspective view of a link between a propulsion assembly (the nacelle not being all represented) and an aircraft fuselage (the skin not being all represented) which illustrates an embodiment of the prior art, FIG. 5 is a perspective view of a link between a propulsion assembly (the nacelle not being all represented) and an aircraft fuselage (the skin not being all represented) which illustrates an embodiment of the invention.

DETAILED DESCRIPTION OF THE PREFERRED EMBODIMENTS

Figure 6:
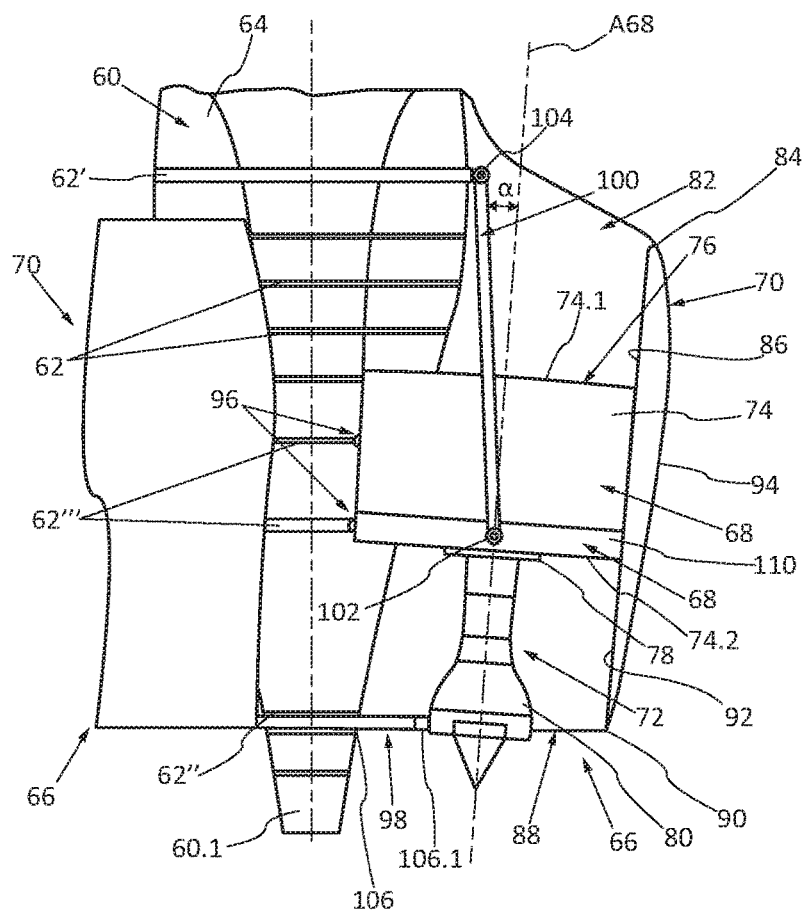
FIG. 6 is a plan view of the link visible in FIG. 5.
Figure 4:
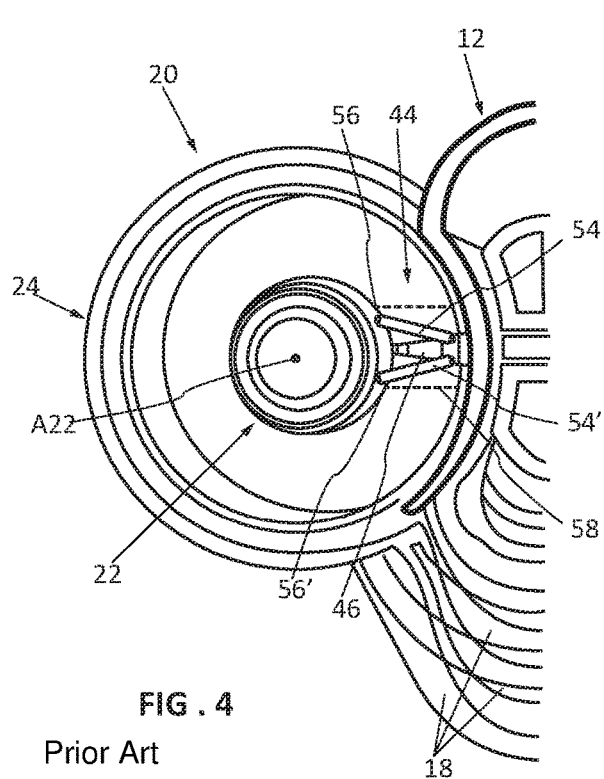
FIG. 4 is a front view of the link visible in FIG. 3.
Figure 7:
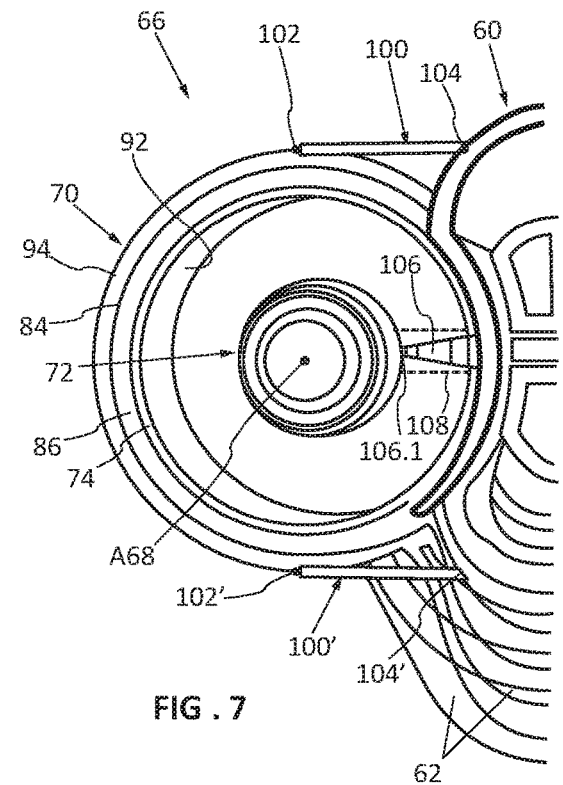
FIG. 7 is a front view of the link visible in FIG. 5.

In FIGS. 5, 6 and 7, a tail cone 60.1 of an aircraft fuselage 60 has been represented.

The fuselage 60 comprises a framework which has frames 62, positioned in transverse planes (approximately at right angles to the longitudinal axis of the aircraft which goes from the nose cone to the tail cone), and stringers (not represented) which link the frames 62 and a skin 64 added onto the framework.

The skin 64 delimits an inner zone of the fuselage 60.

The frames 62 have a section which reduces towards the end of the tail cone 60.1.

According to an embodiment visible in FIGS. 5 and 7, each frame 62 comprises a top part with a convex curvature, a bottom part with a convex curvature and two lateral parts each with a concave curvature.

The frames 62 each have a profile that is symmetrical relative to a vertical median plane (vertical plane containing the longitudinal axis of the aircraft).

The aircraft comprises two propulsion assemblies 66 positioned at the tail cone 60.1 of the fuselage 60 symmetrically relative to the vertical median plane.

Each propulsion assembly 66 comprises an engine 68 and a nacelle 70 positioned around the engine 68, over a part of its circumference.

The engine 68 is of turbofan engine type. It comprises a core 72, which comprises in particular a rotor that pivots relative to a stator on a rotation axis A68 of the engine, and a fan casing 74 which has an approximately cylindrical form and in which there is a fan 76 linked to the rotor of the core 72 of the engine.

In operation, a first air flow, called primary flow, circulates inside the core 72 of the engine and a second flow, called secondary flow, circulates between the core 72 of the engine and the nacelle 70.

The fan casing 74 takes the form of a cylinder that is coaxial to the rotation axis A68 of the engine 68 and comprises a front edge 74.1 and a rear edge 74.2.

The engine 68 comprises straighteners 77, linking the fan casing 74 and the core 72 of the engine 68, which make it possible to straighten the secondary flow. These straighteners 77 are radial elements positioned in proximity to the rear edge 74.2 of the fan casing 74. They are represented schematically in FIG. 5.

The core 72 extends from a front casing 78 which comprises an air intake to a rear casing 80 which comprises a combustion gas exhaust.

The nacelle 70 comprises, at the front, an air inlet 82 which has a lip 84 and a front inner duct 86 in the extension of the lip 84, configured to channel the air towards the fan casing 74 and, at the rear, an exhaust 88 which has a trailing edge 90, a rear inner duct 92 which extends from the fan casing 74 to the trailing edge 90. The nacelle 70 also comprises at least one outer wall 94 which extends from the lip 84 to the trailing edge 90.

The lip 84, the front inner duct 86 and the outer wall 94 delimit an inner zone of the air inlet 82.

In the present case, the nacelle 70 does not extend over all the circumference of the engine 68. The nacelle 70 is nested in the fuselage 60, zones of which delimit a part of the air inlet 82 and a part of the exhaust 88. This configuration of propulsion assemblies called BLI, for Boundary Layer Ingestion, allows for a substantial saving in terms of energy consumption.

According to this configuration, the lateral parts with the concave curvature of certain frames 62 of the fuselage 60 mold to the forms of the fan casing 74 and of the front and rear inner ducts 86, 92 of the nacelle 70. The skin 64 of the fuselage and the outer wall 94 of the nacelle 70 on the one hand, the skin 64 of the fuselage and the front and rear inner ducts 86, 92 on the other hand, have junction zones. Thus, the inner zone of the air inlet 82 communicates with the inner zone of the fuselage 60.

The different parts of the engine 68 and of the nacelle 70 are not described further because they can be identical to those of the prior art.

The engine 68 is linked to the fuselage 60 by a link which comprises:

A front engine attachment 96 linking the fan casing 74 and the fuselage 60, A rear engine attachment 98 linking the rear part of the core 72 of the engine 68, more particularly its rear casing 80, and the fuselage 60, and At least two connecting rods 100, 100' linking the fan casing 74 and the fuselage 60, each connecting rod 100, 100' comprising a first anchoring point 102, 102' linking the connecting rod 100, 100' to the fan casing 74 and a second anchoring point 104, 104' linking the connecting rod 100, 100' to the fuselage 60, offset forwards relative to the first anchoring point 102, 102'.

Thus, each connecting rod 100, 100' is positioned at least partially in the inner zone of the air inlet 82 and does not interfere with the secondary flow.

According to a configuration, for each connecting rod 100, 100', the first anchoring point 102, 102' is positioned in line with the straighteners 77. In line should be understood to mean that the first anchoring point 102, 102' is positioned in the same transverse plane(s) (plane(s) at right angles to the rotation axis A68 of the engine) as the straighteners 77. Thus, the first anchoring point 102, 102' is positioned at or close to the rear edge 74.2 of the fan casing 74.

According to another feature of the invention, for each connecting rod 100, 100', the first and second anchoring points 102, 102', 104, 104' are arranged so that the connecting rod 100, 100' and the rotation axis A68 of the engine 68 form an angle α that is as small as possible, seen from above.

For each connecting rod, the first and second anchoring points 104, 104' are as far apart as possible.

The first anchoring point 102, 102' is positioned approximately in the vertical median plane of the engine 68 (vertical plane containing the rotation axis A68 of the engine 68), as illustrated in FIG. 6. Thus, the first anchoring point 102 of the first connecting rod 100 is positioned at the highest point of the fan casing 74 and the first anchoring point 102' of the second connecting rod 100' is positioned at the lowest point of the fan casing 74, as illustrated in FIG. 7.

For each connecting rod 100, 100', the second anchoring point 104, 104' is linked to one of the frames 62, referenced 62', of the fuselage 60.

The second anchoring point 104, 104' is offset forwards relative to the front edge 74.1 of the fan casing 74 so that the angle α between the connecting rod 100, 100' and the rotation axis A68 of the engine 68 is less than 25°. According to an embodiment, the second anchoring point 104, 104' is offset forwards relative to the front edge 74.1 of the fan casing 74 so that the angle α is less than 10°.

The second anchoring point 104, 104' and the front edge 74.1 of the fan casing 74 are separated by a distance substantially equal to a distance separating the first anchoring point 102, 102' and the front edge 74.1 of the fan casing 74.

According to one embodiment, the second anchoring points 104, 104' are disposed in one and the same vertical plane. This solution makes it possible to obtain a symmetrical loading between the two second anchoring points.

The connecting rods 100, 100' are substantially symmetrical relative to a horizontal median plane of the engine 68 (horizontal plane containing the rotation axis A68 of the engine 68). For each connecting rod 100, 100', the first and second anchoring points 102, 102', 104, 104' are disposed in a substantially horizontal plane.

The rear engine attachment 98 comprises a crossmember 106 which extends in a horizontal and transverse direction (at right angles to the longitudinal axis of the fuselage) and which has a first end 106.1 linked to the core 72 of the engine 68.

According to a configuration, the crossmember 106 links the cores 72 of the engines 68 of the propulsion assemblies disposed on either side of the fuselage and comprises a first end 106.1, linked to the core 72 of the engine 68 of a first propulsion assembly, and a second end linked to the core of the engine of a second propulsion assembly, the median part of the crossmember 106 being linked to at least one frame 62, referenced 62", of the fuselage 60.

As illustrated in FIG. 7, the crossmember 106 is positioned inside a fairing 108, also called bifurcation, represented by dotted lines.

The front engine attachment 96 linking the fan casing 74 and the fuselage 60 comprises links between the fan casing 74 and frames 62, referenced 62''' of the fuselage and/or a strap 110 which bands the fan casing 74 and which is linked to the fuselage 60, in particular at one of the frames 62''' of the fuselage 60. This strap 110 is positioned in line with the straighteners 77.

The invention provides the following advantages:

According to a first advantage, the connecting rods 100, 100' being positioned in the air inlet, the volume of the bifurcation 108 is restricted, which makes it possible to reduce the aerodynamic drag and to eliminate the aft pylon fairing APF.

According to a second advantage, the connecting rods 100, 100' are away from the hot zones of the engine 68 so that it is possible to produce them in composite material based on carbon fiber reinforced polymer, called CFRP, which is more resistant to vibrations.

According to a third advantage, the positioning of the connecting rods at the air inlet makes it possible to be able to separate the anchoring points of each connecting rod which makes it possible ultimately to reduce the angle α between the rotation axis of the engine and each connecting rod. The reducing of this angle α makes it possible to reduce the risks of distortion of the engine and to optimize its operation.

Finally, the invention makes it possible to eliminate the pylon and replace it with a crossmember which has a much smaller weight, which makes it possible to reduce the embedded weight.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising a fuselage and at least one propulsion assembly which comprises:
    an engine comprising a rotation axis, a core and a fan casing which has an approximately cylindrical form and has a front edge and a rear edge, a nacelle comprising, at the front, an air inlet which has a lip, a front inner duct configured to channel a flow of air towards the fan casing and an outer wall delimiting, with the lip and the front inner duct, an inner zone of the air inlet, a link linking the engine and the fuselage and comprising at least two connecting rods, wherein each connecting rod comprises a first anchoring point linking the connecting rod to the fan casing and a second anchoring point linking the connecting rod to the fuselage and offset forwards relative to the first anchoring point so that each connecting rod is positioned at least partially in the inner zone of the air inlet.

2. The aircraft according to claim 1, wherein the engine comprises straighteners linking the fan casing and the core of the engine and wherein, for each connecting rod, the first anchoring point is positioned in line with the straighteners.

3. The aircraft according to claim 2, wherein the link linking the engine and the fuselage comprises a front engine attachment comprising a strap which bands the fan casing, which is linked to the fuselage and which is positioned in line with the straighteners.

4. The aircraft according to claim 1, wherein, for each connecting rod, the first and second anchoring points are arranged so that the connecting rod and the rotation axis of the engine form an angle less than 25°.

5. The aircraft according to claim 1, wherein, for each connecting rod, the first anchoring point is positioned in a vertical plane containing the rotation axis of the engine.

6. The aircraft according to claim 1, wherein the second anchoring point and the front edge of the fan casing are separated by a distance substantially equal to a distance separating the first anchoring point and the front edge of the fan casing.

7. The aircraft according to claim 1, wherein the second anchoring points are disposed in one and the same vertical plane.

8. The aircraft according to claim 1, wherein the connecting rods are substantially symmetrical relative to a horizontal median plane of the engine.

9. The aircraft according to claim 1, wherein the link linking the engine and the fuselage comprises a rear engine attachment comprising a crossmember which extends in a horizontal and transverse direction, which is linked to the fuselage and which has a first end linked to the core of the engine.

10. The aircraft according to claim 9, wherein the crossmember has a first end, linked to the core of the engine of a first propulsion assembly, and a second end linked to the core of the engine of a second propulsion assembly, a median part of the crossmember being linked to the fuselage.

11. The aircraft according to claim 1, wherein the link linking the engine and the fuselage comprises a front engine attachment comprising a strap which bands the fan casing and which is linked to the fuselage.

* * * * *